(12) United States Patent
Goldberg et al.

(10) Patent No.: US 8,488,635 B2
(45) Date of Patent: Jul. 16, 2013

(54) UV ILLUMINATION FOR MITIGATION OF COLD TEMPERATURE PYROELECTRIC EFFECTS IN LITHIUM NIOBATE

(75) Inventors: Lew Goldberg, Fairfax, VA (US); Brian J. Cole, Fairfax Station, VA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 327 days.

(21) Appl. No.: 12/857,896

(22) Filed: Aug. 17, 2010

(65) Prior Publication Data

US 2012/0044960 A1   Feb. 23, 2012

(51) Int. Cl.
*H01S 3/115*   (2006.01)

(52) U.S. Cl.
USPC .................................. 372/12; 372/10; 372/13

(58) Field of Classification Search
USPC ................................................ 372/10, 12, 13
See application file for complete search history.

(56) References Cited

U.S. PATENT DOCUMENTS

| | | | |
|---|---|---|---|
| 4,884,044 A * | 11/1989 | Heywood et al. | 359/245 |
| 5,237,576 A | 8/1993 | DiGiovanni et al. | |
| 5,966,233 A * | 10/1999 | Fujiwara et al. | 359/240 |
| 7,202,506 B1 | 4/2007 | DenBaars et al. | |
| 2007/0120129 A1 | 5/2007 | DenBaars et al. | |
| 2009/0122818 A1 * | 5/2009 | Nettleton et al. | 372/23 |

OTHER PUBLICATIONS

Brian Cole, Lew Goldberg, Vernon King, and Jeff Leach, "Influence of UV illumination on the cold temperature operation of a LiNbO3 Q-switched Nd:YAG laser," Optics Express, vol. 18, Issue 9, pp. 9622-9627 (2010).

* cited by examiner

*Primary Examiner* — Jessica Stultz
*Assistant Examiner* — Joshua King
(74) *Attorney, Agent, or Firm* — Richard J. Kim

(57) ABSTRACT

An actively Q-switched laser based on UV illumination mitigates pyroelectric effects in lithium niobate. An exemplary embodiment comprises a pump source; a dichroic mirror having one end optically facing said pump source; a gain medium optically facing another end of said dichroic mirror; a polarizer having one end optically facing another end of said gain medium; a quarter wave plate having one end optically facing another end of said polarizer; and a electro-optic crystal having one end optically facing said quarter wave plate, at least one side of said electro-optic crystal being electrically connected to Q-switch driver to have the crystal function as a Q-switch. A UV illumination source illuminates a side surface of said electrical-optic crystal with UV light. An output mirror receives an output from said Q-switch and produces a laser emission.

7 Claims, 4 Drawing Sheets

UV ILLUMINATION FOR MITIGATION OF COLD TEMPERATURE PYROELECTRIC EFFECTS IN LITHIUM NIOBATE

GOVERNMENT INTEREST

The invention described herein may be manufactured, used, sold, imported, and/or licensed by or for the Government of the United States of America.

FIELD OF THE INVENTION

This invention relates in general to lasers, and more particularly, Q-switched laser with UV illumination.

BACKGROUND OF THE INVENTION

Lithium niobate ($LiNbO_3$) is one of the most common electro-optic crystals used for active Q-switching of lasers and for optical modulators. Lithium Niobate is well known to have a strong pyroelectric effect that causes charges to be built up on its crystal C-faces when the crystal temperature changes. These charges impose an electric field across the crystal that can cause a significant reduction in effective Q-switch attenuation and the hold-off level, thereby reducing the maximum energy that can be stored in a laser gain medium for light output from the laser.

The effects of pyroelectric charges in niobate are negligible at room temperatures and above because the crystal conductivity is sufficient to allow the surface charge to be dissipated. At low temperatures, however, the conductivity is much smaller, so that the pyroelectric charges remain, causing a large reduction in the Q-switch hold-off. One technique for mitigating this cold temperature problem has been to place a radioactive Americium near the crystal faces to neutralize the surface charges. However, such uses of a radioactive material can be costly, and may entail storage and licensing requirements.

SUMMARY OF THE INVENTION

An actively Q-switched laser based on UV illumination mitigates pyroelectric effects in lithium niobate. An exemplary embodiment comprises a pump source; a dichroic mirror having one end optically facing said pump source; a gain medium optically facing another end of said dichroic mirror; a polarizer having one end optically facing another end of said gain medium; a quarter wave plate having one end optically facing another end of said polarizer; and a electro-optic crystal having one end optically facing another end of said quarter wave plate, at least one side of said electro-optic crystal being electrically connected to a Q-switch driver to have the crystal function as a Q-switch. A source of UV illumination illuminates a side surface of said electrical-optic crystal with UV light. An output mirror receives an output from said Q-switch and produces a laser emission.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

For Q-switching applications, a lithium niobate ($LiNbO_3$) crystal can be used. Further, an exemplary embodiment of an actively Q-switched laser can utilize a lithium niobate crystal doped with one or more dopant(s), including, e.g., magnesium, iron, and zirconium. Dopant levels can be on the order of 0-5% (molar). Such exemplary addition of dopants to LiNbO3 has been shown to increase photoconductivity, which is an important parameter for improved mitigation of pyroelectric effects in lithium niobate.

Figure 1A:
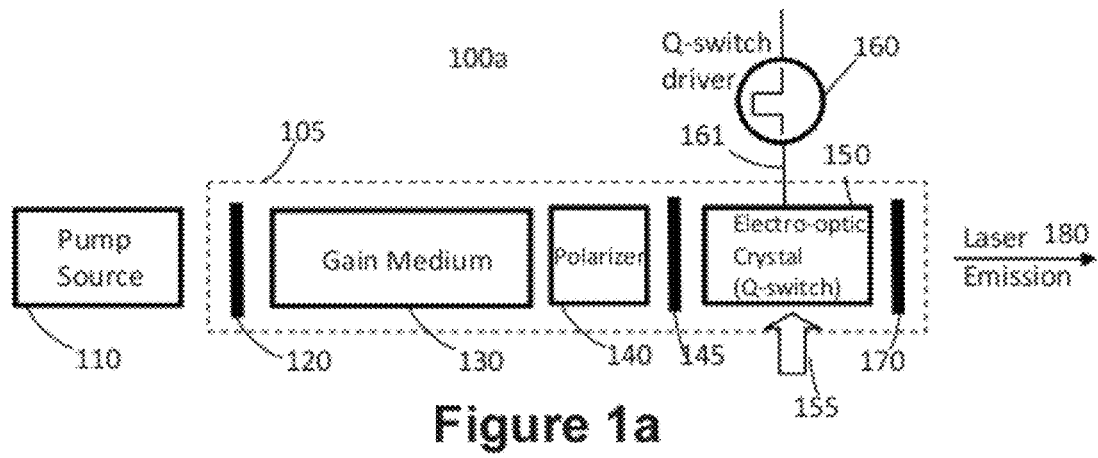
FIG. 1a shows an exemplary embodiment of an actively Q-switched laser based on UV illumination for mitigation of pyroelectric effects in lithium niobate.

An exemplary embodiment of an actively Q-switched laser as shown in FIG. 1a is based on UV illumination for mitigation of pyroelectric effects in lithium niobate. For example, an electro-optic crystal 150 is based on a $LiNbO_3$ crystal, e.g., configured to have its optical "C" axis aligned along a laser light propagation direction in a laser resonator cavity. For improved mitigation of pyroelectric effects, said $LiNbO_3$ crystal 150 can be doped with one or more dopant(s), including, e.g., magnesium, iron, and/or zirconium. As further shown in FIG. 1a, a pump source 110 optically faces one end of a laser cavity 105 to produce a laser emission 180 at another end of said laser cavity 105. Such a laser cavity comprises a dichroic minor 120 having said one end facing the pump source 110, another end of said dichroic minor 120 facing one end of a gain medium 130. Such a gain medium 130 can be comprised of an Nd:YAG rod. Said gain medium 130 has another end optically facing one end of a polarizer 140, another end of said polarizer 140 facing one end of a quarter wave ($\lambda/4$) plate 145. Another end of said quarter wave ($\lambda/4$) plate 145 faces one end of said electro-optic crystal 150. At least one side of said electro-optic crystal 150 is electrically connected to a Q-switch driver 160 to have the crystal 150 function as a Q-switch. For example, one or more electrode end(s) 161 leading from said Q-switch driver 160 can be deposited on one or more sides of the crystal 150. The Q-switch 150 is disposed to direct its output emission at its output end to one end of an output mirror 170 to produce a laser emission 180 at another end of said output mirror as the laser emission 180 from the laser cavity 105.

Referring now to said side(s) of said electro-optic crystal 150 electrically connected with a Q-switch driver 160, when no voltage is applied through the electrode(s) to the respective side(s) the crystal 150, said quarter wave ($\lambda/4$) plate 145 and the polarizer 140 present a high propagation loss for the light inside the resonator cavity 105; the laser action is blocked so that high population inversion can be built up in the pumped gain medium 130, corresponding to a large stored energy. When a high voltage is applied to said electrodes deposited on the sides of crystal 150, light propagating through the crystal 150 experiences quarter wave polarization rotation so that it can now propagate without significant toss through the laser resonator cavity. When the loss element switches to such a high transmission state, laser action commences, quickly releasing the stored energy via stimulated emission. The Q-switched output is a relatively short pulse, e.g., a 1-25 ns laser emission for such an exemplary Nd:YAG laser.

The propagation loss presented by the Q-switch 150, the quarter wave plate 145 and the polarizer 140 in which the Q-switch is in the "off" state (e.g., no voltage applied by the Q-switch driver 160) provides a laser hold-off attenuation that determines the maximum gain, inversion level and energy storage that can be achieved in the laser without initiation of laser action in the resonator cavity 105.

As further exemplified in FIG. 1*a*, UV illumination 155 on a side surface of said crystal 155 can significantly eliminate the reduction in hold-off that occurs in lithium niobate Q-switches at cold temperatures. An exemplary UV illumination can be produced from any known UV source 155, including a UV laser, a UV LED, etc.

Figure 1B:
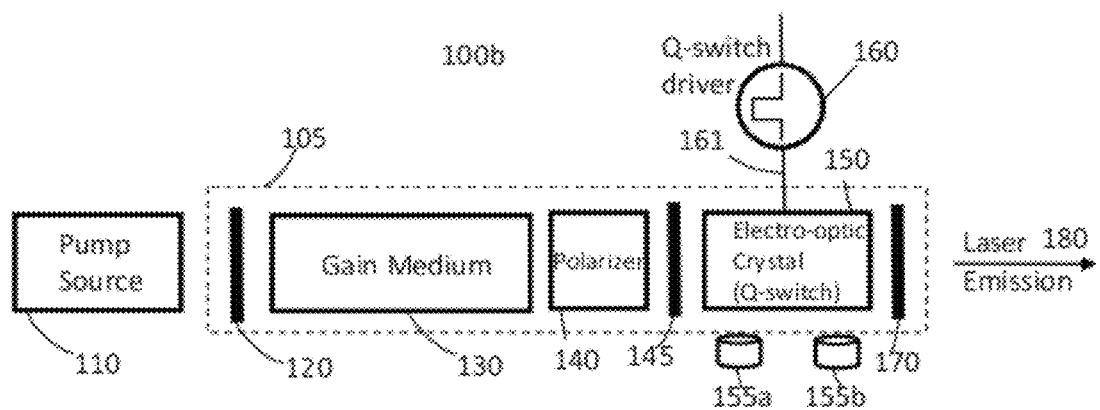
FIG. 1b shows another exemplary embodiment of an actively Q-switched laser based on a plurality of UV sources.

Alternatively, as shown in FIG. 1*b*, another exemplary embodiment uses UV illumination from a plurality of UV sources (e.g., shown with two UV sources 155*a*, 155*b*) placed in close proximity of crystal face(s) of a lithium niobate (LiNbO$_3$) crystal 150. Likewise, for improved mitigation of pyroelectric effects, said LiNbO$_3$ crystal 150 can be doped with one or more dopant(s), including, e.g., magnesium, iron, and/or zirconium. In one exemplary embodiment, two Nichia™ 365 nm LEDs, each having a 1×1 mm emission area, were configured as UV sources (155*a*, 155*b*) against a crystal face of a lithium niobate (LiNbO$_3$) crystal 150 as shown in FIG. 1*b*.

Figure 2A:
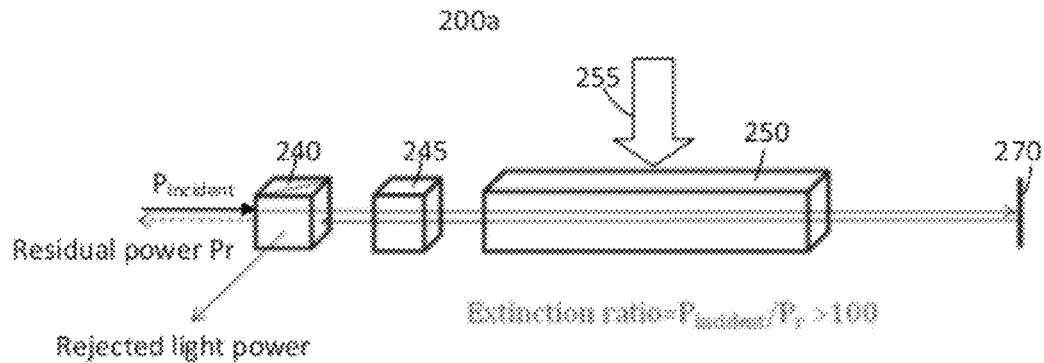
FIG. 2a shows operating principle of an electooptic Q-switch with exemplary light traces of laser light propagating through it.

Looking at FIG. 2*a*, we examine an optical aspect of light traces based on an exemplary configuration comprising a polarizer 240, a quarter wave (λ/4) plate 245, a lithium niobate (LiNbO$_3$) crystal 250, and a mirror 270 optically arranged as a basis for a laser cavity. For improved mitigation of pyroelectric effects, said LiNbO$_3$ crystal 250 can be doped with one or more dopant(s), including, e.g., magnesium, iron, and/or zirconium. Tracing from the left, a light source is directed to one end of said polarizer 240. Said polarizer 240 outputs polarized light from its another end to one end of said quarter wave (λ/4) plate 245. Said quarter wave (λ/4) plate 245 emits light from its another end to one end of said lithium niobate (LiNbO$_3$) crystal 250, UV illumination is applied to a side of said lithium niobate (LiNbO$_3$) crystal 250, wherein the extinction ratio can be characterized as follows: Extinction ratio=$P_{incident}/P_r$>100, where $P_{incident}$ is incident power, and $P_r$ is residual power. Another end of said lithium niobate (LiNbO$_3$) crystal 250 emits light which is reflected back from a mirror 270 to said another end of said crystal 250, wherein said UV illumination can result in dissipation of surface charges caused by the pyroelectric effect of the crystal 250, and makes it possible to maintain a large extinction ratio, or hold-off, at low temperatures.

Tracing further through the reflected path shown in FIG. 2*a*, said reflected light traverses in a return path through said crystal 250 and is emitted out of said one end of said crystal 250. Said return light from said one end of said crystal 250 is passed through said quarter wave (λ/4) late 245 and enters said another end of said polarizer 240 wherein a residual power $P_r$ is returned from said one end of said polarizer, and a rejected light power is returned from a side of said polarizer.

As before, a UV source 255 can be placed in a close proximity 10 UV illuminate a side surface of said crystal 255 to eliminate the reduction in hold-off that occurs in lithium niobate Q-switches at cold temperatures. UV illumination as exemplified in FIG. 2*a* can be produced from any known UV source 255, including a UV laser, a UV LED, etc. It is preferable to flood-illuminate the crystal so that the entire volume of the crystals is illuminated by the UV light.

Figure 2B:
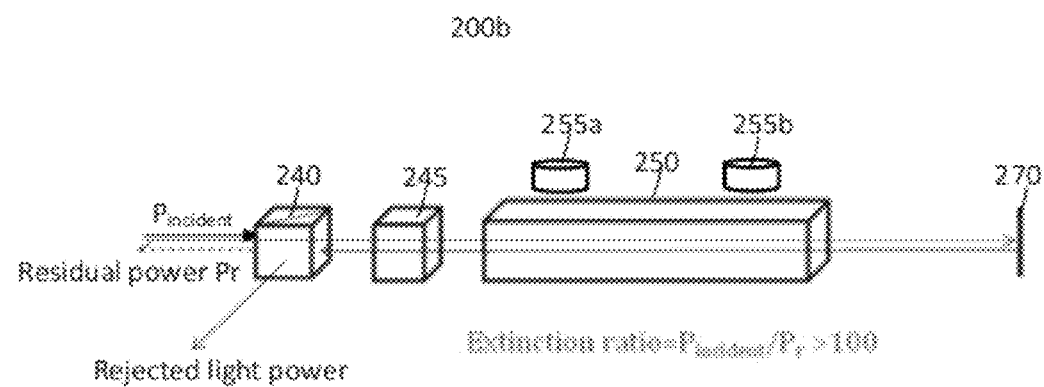
FIG. 2b shows placement of a plurality of UV sources for mitigation of pyroelectric effects in lithium niobate Q-switch.

Alternatively, as shown in FIG. 2*b*, an exemplary embodiment uses a plurality of UV sources (e.g., shown with two UV sources 255*a*, 255*b*). Likewise, for improved mitigation of pyroelectric effects, said LiNbO$_3$ crystal 250 can be doped with one or more dopant(s), including, e.g., magnesium, iron, and/or zirconium. In one exemplary embodiment, two cost commercially available 365 nm LED's (e.g., Nichia™ 365 nm LED having a 1×1 mm emission area) were configured as UV sources (255*a*, 255*b*) against a crystal face of a lithium niobate crystal 250 as shown in FIG. 2*b*.

Figure 3:
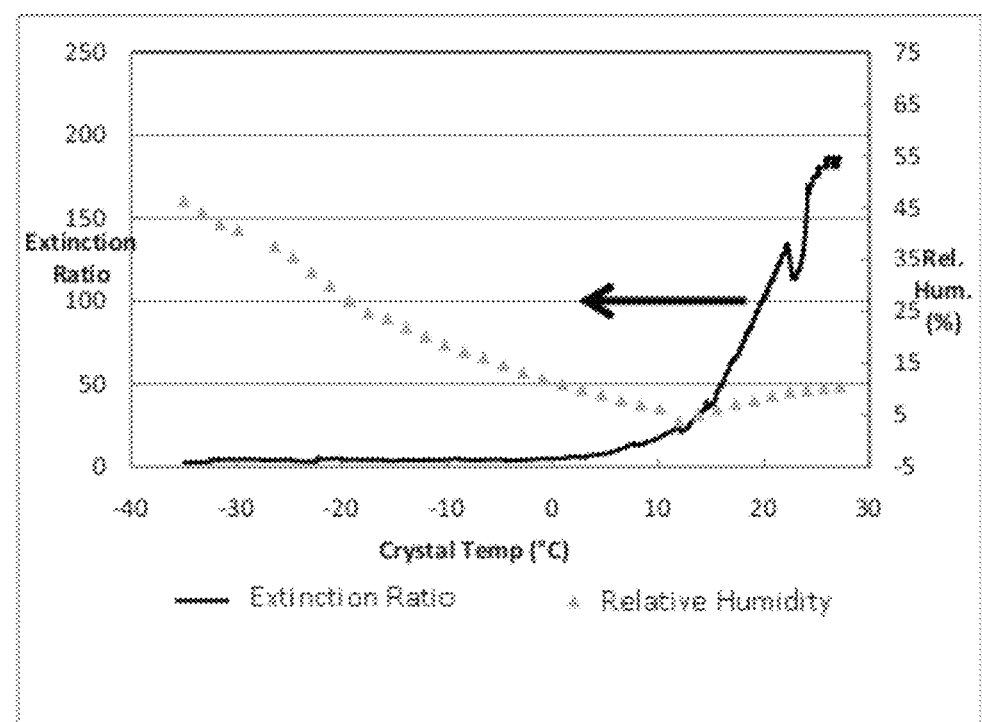
FIG. 3 shows an exemplary chart of Q-switch extinction with no UV illumination.

Exemplary extinction vs. temperature measurements with no illumination are shown in FIG. 3. As shown, there is a line graph of extinction ratio vs. crystal temperature ° C., which is overlaid with a graph of relative humidity (%) vs. crystal temperature ° C. data points. Measurements as exemplified for extinction and humidity show that with no UV illumination the extinction can decrease from more than 150 (22 dB) at room temperatures to less than 10 (10 dB) at about 5° C. or below. This decrease in extinction is caused by build-up of pyroelectric charges on the faces of the crystal that occurs when the crystal temperature changes and the crystal conductivity is insufficient to dissipate said charges. While above 5° C. the inherent electrical conductivity in the crystal appears to be sufficient to dissipate the pyroelectric charges, it is too low to do so below that temperature.

Figure 4:
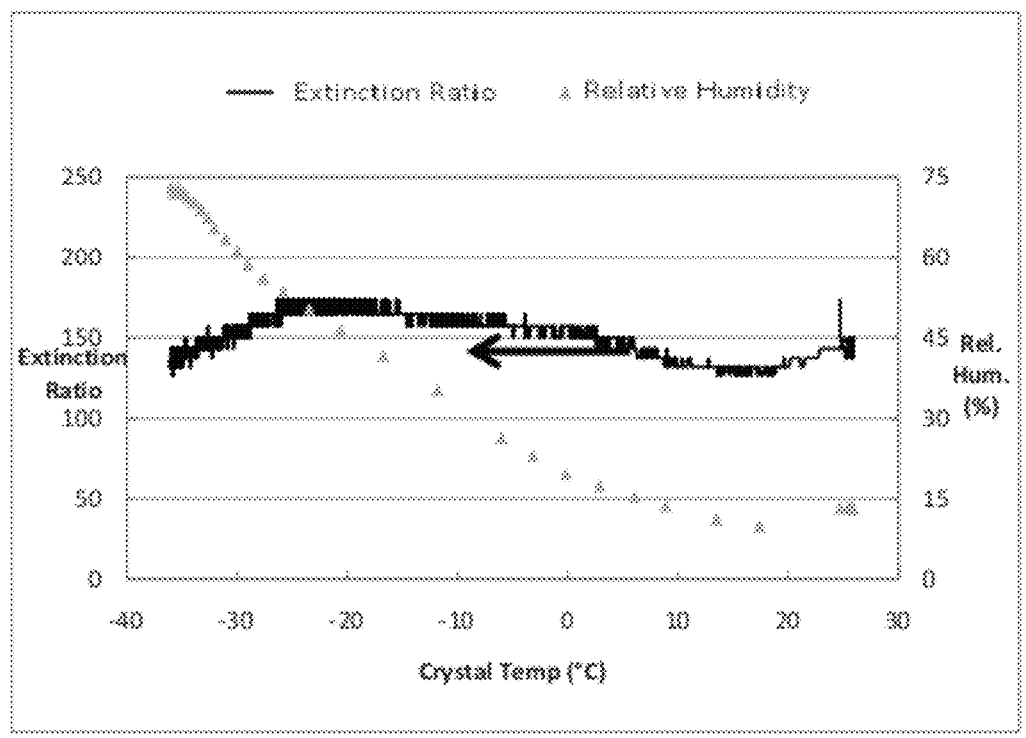
FIG. 4 shows an exemplary chart of Q-switch extinction with UV illumination.

In contrast, exemplary extinction vs. temperature measurements with UV illumination as variously exemplified are shown in FIG. 4. As shown, there is a line graph of extinction ratio vs. crystal temperature ° C., which is overlaid with a graph of relative humidity (%) vs. crystal temperature ° C. data points. Measurements as exemplified for 500 mA current put through UV LEDs demonstrate improved extinction for the characterized temperature and humidity measurements. With UV illumination, an extinction of above 100 (20 dB) can be maintained through the entire temperature range, including negative temperature ranges down to −35° C. as shown.

Actively Q-switched laser using a doped lithium niobate crystal as variously disclosed can yield significantly improved mitigation of pyroelectric effects. In For example, in the absence of UV illumination, a pyroelectric induced loss of hold-off was measured for a lithium niobate crystal doped with magnesium. Turning on the UV returned the sample to a state of high extinction at a particular rate (i.e., the decay rate for the pyroelectric charges). A comparison of such a Mg-doped sample to pure LiNbO$_3$ showed a >20× increase in the rate of decay of pyroelectric charges in the presence of UV. Accordingly, actively Q-switched lasers as variously exemplified can utilize a doped LiNbO$_3$ crystal to better achieve a significantly improved reduction in requisite fluence for UV light.

It is obvious that many modifications and variations of the present invention are possible in light of the above teachings. It is therefore to be understood that within the scope of the appended claims, the invention may be practiced otherwise than as described.

What is claimed is:

1. An actively Q-switched laser based on UV illumination, comprising:
   a pump source;
   a dichroic mirror having one end optically facing said pump source;
   a gain medium optically facing another end of said dichroic mirror;
   a polarizer having one end optically facing another end of said gain medium;

a quarter wave plate having one end optically facing another end of said polarizer;

an electro-optic lithium niobate crystal having one end optically facing another end of said quarter wave plate, at least one side of said electro-optic lithium niobate crystal being electrically connected to a Q-switch driver to have the crystal function as a Q-switch;

a source of UV illumination directed to illuminate a side surface of said electrical-optic lithium niobate crystal with UV light to dissipate pyroelectric surface charges associated with the lithium niobate crystal and maintain an extinction ratio above 100 through a temperature range extending as low as −40 degrees Celsius, the extinction ratio being defined as $P_{incident}/P_r$; and an output mirror to receive an output from said Q-switch and produce a laser emission.

2. The actively Q-switched laser accordingly to claim 1, wherein said electro-optic lithium niobate crystal is based on a $LiNbO_3$ crystal configured to have its optical C axis aligned along a laser light propagation direction.

3. The actively Q-switched laser accordingly to claim 2, wherein said $LiNbO_3$ crystal is doped with one or more dopant chosen from a group comprising magnesium, iron, and zirconium.

4. The actively Q-switched laser accordingly to claim 1, wherein said gain medium is comprised of an Nd:YAG rod, and wherein an output from said Q-switch is characterized by a pulse of about 1-25 ns laser emission.

5. The actively Q-switched laser accordingly to claim 1, wherein said UV illumination of a side surface of said crystal eliminates the reduction in hold-off that occurs in lithium niobate Q-switches at cold temperatures.

6. The actively Q-switched laser accordingly to claim 1, wherein said source of UV illumination is comprised of at least one UV source disposed towards a crystal face of said electro-optic lithium niobate crystal.

7. The actively Q-switched laser accordingly to claim 1, wherein said source of UV illumination is comprised of a plurality of UV LEDs having an emission area configured to illuminate a crystal face of said electro-optic lithium niobate crystal with a plurality of UV light.

* * * * *